UNITED STATES PATENT OFFICE.

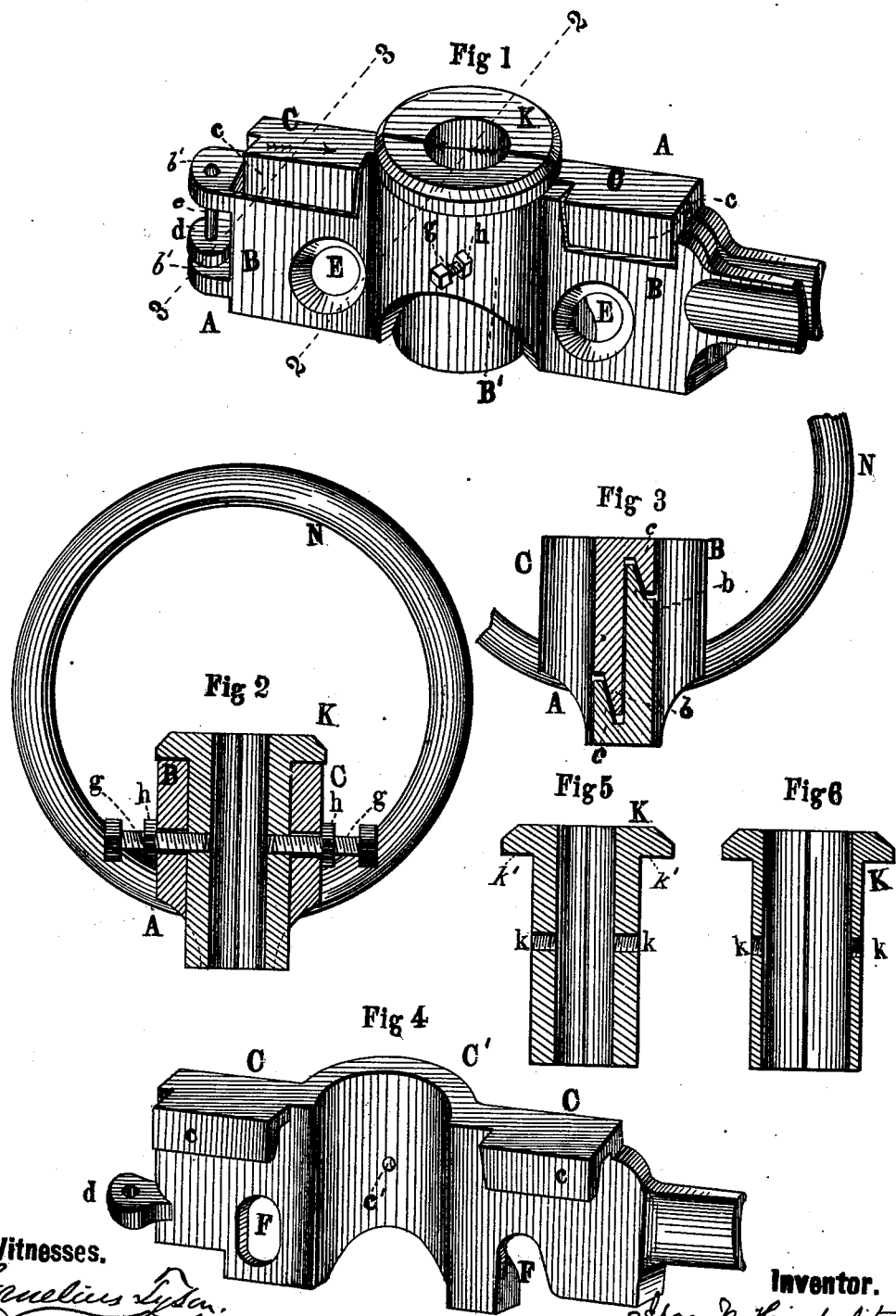

ISAAC N. HINDERLITER, OF CRANBERRY TOWNSHIP, VENANGO COUNTY, PA.

IMPROVEMENT IN TUBE-CLAMPS FOR OIL-WELLS.

Specification forming part of Letters Patent No. 215,001, dated May 6, 1879; application filed July 13, 1878.

*To all whom it may concern:*

Be it known that I, ISAAC N. HINDERLITER, of Cranberry township, in the county of Venango and State of Pennsylvania, have invented certain new and useful Improvements in Tubing Clamp and Elevator; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 represents a perspective view of my improved tubing-elevator, the rings for operating the same being removed. Fig. 2 is a cross-section of the same, taken through line 2 2 of Fig. 1, exhibiting one of the rings. Fig. 3 is a cross-section taken through line 3 3 of Fig. 1. Fig. 4 represents a perspective view of one-half of my improved elevator. Figs. 5 and 6 represent, in section, different-sized bushings internally, the external diameters being the same.

The arrows represented in Fig. 1 indicate the directions in which sections 2 and 3 are taken.

My invention consists of improved devices for supporting and elevating tubing.

Tubing-elevators, as heretofore constructed, are adapted only for one-sized tubing. With my improved devices tubing of any diameter can be used. To accomplish this I employ bushings of various sizes in their internal diameters, the external diameters being all the same, thus obviating the necessity of having an elevator for every size of tubing or pipe used.

My invention further consists of the novel method of securing the two halves or wings and holding the same in position with or without the weight of the tubing or the use of links pressing against the sides of the same, as has been heretofore used to hold clamps together, and keeping the same from parting from the great weight of the tubing resting thereon.

The elevator is represented by A, and bisected longitudinally, forming wings B and C, and having connected thereto at one end ears $b'$, $b'$, and $d$, tightly secured by a rivet or pin, $e$. The central parts, B' and C', are exact semicircles, and form a true circle when closed, said circle being adapted for the largest-sized casing, tubing, or pipe.

When it is required to use various-sized tubing, I employ bushings, as represented at K K, or larger or smaller, as occasion may require. Said bushings are bisected vertically, and provided with threaded holes $k\,k\,k\,k$ in each half, and secured in position by set-screws $g\,g$, passing through B' and C', and having jam-nuts $h\,h$ for holding the bushings firmly against the clamps. The bushings are also provided with a rim or flange, $k'\,k'$, for preventing the same from dropping through the clamps.

The wings B and C are held together, when closed, by means of lip-grooves $c\,c$, beveled on the inside, and overlapping beveled tongues $b\,b$. Said bevels are so arranged as to draw the wings tightly together. The greater the weight of tubing the more securely the wings or clamps are held together. The clamps are also provided with openings E E and F F for receiving rings N N for elevating the clamps and tubing.

It is not absolutely necessary to use rings or links, as a rope or chain can be placed under the clamps and operate equally as well.

In operating my improved elevator, I place the bushings between the clamps, to suit the size of tubing to be used, securing the same by set-screws, as heretofore described, then opening the clamps, and clasp the same around the tubing, which is elevated or lowered in the ordinary manner.

The rings are used only for raising or lowering the tubing clamps or wings, and not for holding the same together, the clamps being so constructed, through the medium of wedge-fastenings or lips and tongues, that no other security is necessary.

Tubing-elevators, as heretofore constructed, are imperfect and dangerous, not only to the operators, but well-owners, as the greatest care must be exercised to keep the clamps from parting, as the tubing acts like a wedge in its downward thrust against the top of the clamps. This is accomplished, in some cases, by long links, slightly flattened at the lower ends, and pressing against the side of the clamps. In others the clamps are bisected transversely and provided with trunnions, which are very insecure, and supported by links in the ordinary manner.

With my improved devices, there is no danger to the well or operators, as the wings or clamps are held together by lips and tongues, forming a wedge-seat, and being kept in place by their own weight, and being additionally secure when supporting the tubing, the greater the weight the more firmly the wings are pressed together, and not apart, as in the old style of clamps.

I do not confine myself to any particular form of clamps for supporting my improved bushings; nor do I confine myself to the means employed for holding the clamps together by their own weight or the weight of the tubing.

Having thus described my invention, what I claim as new, and desire to secure by Letters Patent, is—

1. A pair of tubing-clamps, each formed with a half-cylindrical central portion and internal plane faces, provided with lips beveled on the interior to form beveled grooves for the reception of corresponding beveled projections upon the other half of the clamp, substantially as and for the purpose specified.

2. Tubing-clamps hinged together at one end, and provided with a central cylindrical opening for the reception of bisected cylindrical bushings of uniform exterior size and varying interior size, each half of said clamp having beveled lips and grooves to engage with similar grooves and lips upon the other, substantially as shown and described.

3. The combination of hinged tubing-clamps with the pair of flanged bushings K K, secured to the clamps by means of set-screws $g$ and jam-nuts $h$, substantially as and for the purpose described.

ISAAC N. HINDERLITER.

Witnesses:
CORNELIUS TYSON,
W. R. EDELEN.